United States Patent
Scheibling

[15] 3,694,119
[45] *Sept. 26, 1972

[54] SLOT DIE FOR THE PRODUCTION OF MULTI-LAYER LAMINATES

[72] Inventor: Robert Scheibling, Cap D'Ail, France

[73] Assignee: Siamp-Cedap, Societe anonyme monegasque

[*] Notice: The portion of the term of this patent subsequent to Oct. 12, 1988, has been disclaimed.

[22] Filed: Feb. 11, 1969

[21] Appl. No.: 798,404

[30] Foreign Application Priority Data

Feb. 13, 1968 France...................68139702

[52] U.S. Cl. ..................425/131, 264/171, 425/381
[51] Int. Cl. .............................................B29f 3/00
[58] Field of Search..............156/167, 433, 441, 500; 161/109, 140, 68; 264/167, 171, 172, 173, 174; 425/131, 381; 18/13 P, 13 D, 13 K, 13 M, 12 DH, 12 DM, 12 DS

[56] References Cited

UNITED STATES PATENTS

| | | |
|---|---|---|
| 2,761,417 | 9/1956 | Russell et al. ......18/12 DS UX |
| 3,122,789 | 3/1964 | Coffee......................18/12 DS |
| 3,162,896 | 12/1964 | Seubert....................18/12 DS |
| 3,417,430 | 12/1968 | Smedt et al..............18/12 DS |
| 3,377,655 | 4/1968 | Kucharski et al........18/12 DS |
| 3,480,998 | 12/1969 | Von Erdberg...........18/12 DS |

FOREIGN PATENTS OR APPLICATIONS 645,055 7/1962 Canada....................18/12 DS

*Primary Examiner*—J. Spencer Overholser
*Assistant Examiner*—Michael O. Sutton
*Attorney*—Karl F. Ross

[57] ABSTRACT

An extrusion nozzle with a discharge slot has a body with a central tongue separating two passages terminating at that slot, each passage consisting of an inner channel and an adjoining outer channel supplied with synthetic-resin material from respective distributing chambers to form a pair of superposed layers on each side of the tongue. The width of each layer is independently controllable by a pair of resiliently deflectable inner lips, remote from the discharge slot, and a pair of resiliently deflectable outer lips, proximal to that slot, whose distance from the tongue is adjustable by respective screws.

4 Claims, 2 Drawing Figures

PATENTED SEP 26 1972 3,694,119
FIG.1
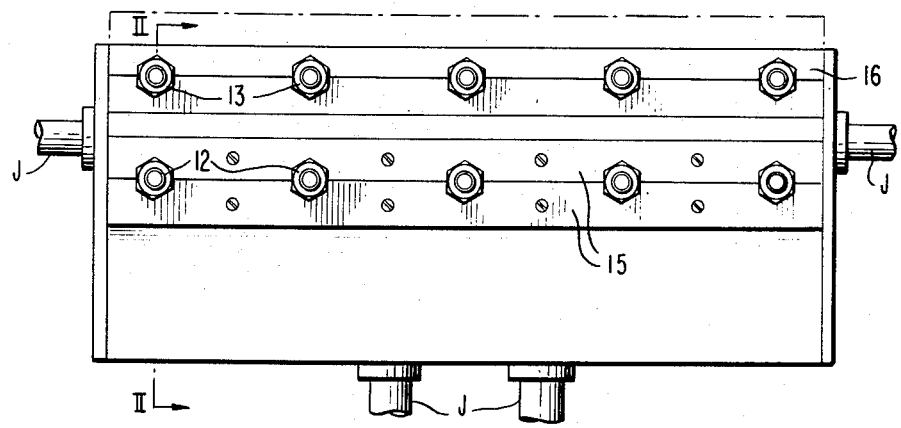
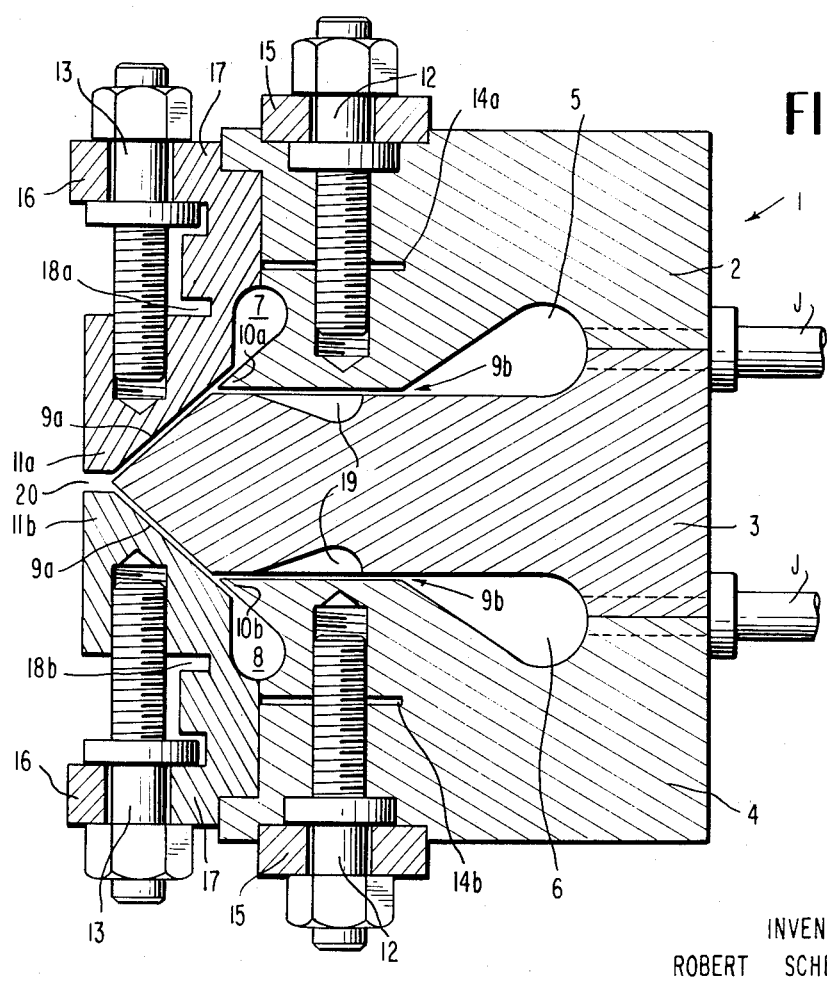
FIG.2
INVENTOR
ROBERT SCHEIBLING
BY Bryan and Bitrum
ATTORNEYS

SLOT DIE FOR THE PRODUCTION OF MULTI-LAYER LAMINATES

The present invention relates to a slot die for the production of multi-layer laminates, in particular of plastic (synthetic resin) materials, by combining several layers, preferably of different materials, at a temperature above their thermoplastic deformation point, which enables the thickness of the individual layers to be adjusted or re-adjusted independently from one another and yields a good bonding strength between the individual layers.

The production of laminates, in particular laminated films of plastic materials, is in wide use today. It is known, for instance, to laminate different plastic films in order to impart to the laminate thus produced the combined properties of the single films used. Another method of producing laminates is used for obtaining products with different colors on the two sides of the laminate. Depending on the materials used and the number and thickness of the individual layers, such laminates may be produced by extruding one layer upon the other or by co-extrusion.

It is also known to produce multi-layer laminates by extrusion processes in which an intermediate layer is extruded into the material forming the two outer layers, the intermediate layer being extruded from a second die and dragging the coating material along.

Further, an apparatus is known in which, by a particular combination of three extruders with the die, a five-layered laminate is produced from three different materials. The main disadvantage of this apparatus is that the connection of the different extruders is technically expensive, that leaks tend to occur at the joints, and that there is no possibility of controlling the layer thickness. Consequently, it is not possible to use this apparatus for the production of multi-layer laminates having layers of varying thicknesses, or multi-layer laminates consisting, e.g., of four different materials.

Further, an apparatus for the production of two-layer laminates is known in which two chambers each to be filled with a different plastic material are connected to a common nozzle. The films produced under pressure are not combined until shortly before they leave the die, which may result in a poor bonding strength of the compound in some cases. The distance of the lips of the die is variable, so that the total thickness of the composite film may be varied. However, this apparatus can not be used for the production of laminates having more than two layers, and no means are provided for regulating the thickness of the individual layers.

Further, a two-piece extruder head is known for the application of top coatings during the production of conveyor belts of plastic materials, which allows a certain control of the layer thickness by means of so-called slidable baffles. The displacement of parts within a die, however, requires complex equipment and, moreover, results in an only limited adjusting accuracy over the whole width of the die, particularly in the case of very wide slot dies and/or very narrow slots.

Further, slot dies for the production of single-layer films are known from the prior art which possess slidable die lips for adjusting the thickness of the films.

The most important disadvantage of these lip constructions, the that, owing to the slidable parts required is sealing surfaces of the apparatus are not very effective. To achieve an approximately satisfactory sealing effect, the surfaces must be pressed upon one another with high pressure, which, on the other hand, considerably impedes the displacement of the die lips. Almost unavoidable inaccuracies in the adjustment of the die result therefrom, in combination with a high expenditure of energy.

To avoid the disadvantages of the above-described die constructions, it has recently been suggested, for the production of single-layer films, to adjust the lips at the die orifice by deflecting the lips with relation to each other; see my prior U.S. Pat. No. 3,611,492. In the case of slot dies for the production of multi-layer laminates, however, it is only known to adjust the final thickness of the laminate by providing adjusting means at the orifice.

It is the object of the present invention to provide a slot die which enables the production of multi-layer, in particular three-layer or four-layer, laminates by heat-sealing several layers consisting preferably of different materials, wherein the thickness of each individual layer may be adjusted independently from the other layers and accurately over the whole width of the laminate. Further, the die should be capable of a simple and quick readjustment, if necessary during operation, and, moreover, the sealing effect of the whole die construction must remain unimpaired in spite of the adjusting means. As a further object of the invention, the different layers should be combined in such a manner as to ensure a good bonding strength between the individual layers.

This object is achieved in a slot die for the production of multi-layer laminates, preferably of plastic materials, by combining several layers consisting preferably of different materials, to which the materials are fed through several channels connected to longitudinal slits and which comprises inner and outer die lips, at least one of the inner die lips and at least one of the outer die lips being capable of an independent elastic deflection around an angle, for adjustment of the respective slit, and wherein the elastic deflection of the inner lips is effected through longitudinal incisions provided in the die block, whereas the elastic deflection of the outer die lips is permitted through notches provided at the outside of the die blocks, by means of devices for creating the forces required for deflection; the longitudinal slits of the feed channels serving for the production of the inner layers join the longitudinal slits of the channels serving for the production of the outer layers preferably before they reach the slot of the die orifice.

Although it is not absolutely necessary, it has proved to be of advantage to have the longitudinal slits of the inner die lips join the longitudinal slits of the outer die lips before the actual die orifice is reached. In this manner, the layers are guided over a longer stretch in contact with each other so that, on account of the prolonged contact, a compound of particularly good bonding strength is produced. To afford a longer period of dwell at the die orifice, which in many cases causes an improvement of the bonding strength, the lips are of an elongated structure.

By means of the die according to the invention, multi-layer laminates may be produced in which the desired layer thicknesses are selected in accordance with the requirements of a particular material. Thus, it is possible, e.g., to produce four-layer laminates in which two extruded layers, which may or may not have the same thickness and may also consist of different materials, are coated onto two inner layers which may or may not be of the same thickness. The thicknesses of the individual layers may be varied as desired without having to change the die, as has been necessary in the past.

If one of the layers is to be made thinner or thicker, the die may be readjusted without interrupting the production of laminates. The resulting advantages over known slot dies are obvious.

Since the slot dies according to the invention have only a few joints because of their elastic lips, the construction can be very easily made tight, which is to be regarded as another advantage.

By virtue of the elastic deflection of the inner and the outer lips, with one of the lips remaining rigid if this is of advantage, the die lips can be easily and accurately adjusted without major efforts.

In a special embodiment of the slot die according to the invention, the feed channels for the materials and/or the longitudinal slits connected to these channels are of such a construction that their cross-section is reduced toward the center of the channels and/or slits. This causes an improvement of the distribution of pressure in the material issuing from the extruders, so that very uniform layers are produced. Depending on the kind of materials used, it may be of advantage to provide the die lips with separate heating or cooling elements of known type. It is particularly advisable to provide a cooling unit at the slot of the die orifice when the outer die lips are relatively short. In a further embodiment of the die, two distribution channels are preferably provided within the interior die block in order to let the deflection of the inner lips act only upon the two outer layers while the total thickness of the laminate is regulated by the outer die lips.

In their simplest version, the means for creating the forces required for the elastic deflection are screws or worms, but, besides these, pneumatically or hydraulically operated pistons may also be used, or combinations of these devices. In a further embodiment of the slot die according to the invention, these parts may, in turn, be provided with control elements of known construction, e.g., motors.

The above described invention will be explained in detail by reference to an exemplary but nonlimiting embodiment shown in the accompanying drawing in which:

FIG. 1 is a top view of a slot die according to my invention; and

FIG. 2 is a section along the line II—II of FIG. 1, drawn to larger scale.

FIG. 1 shows four inlet openings J through which the materials are fed into the die. Screws 12 and 13, distributing over the whole width of the die, serve for adjusting the die. Bars 15 hold the screw heads on the die block.

FIG. 2 shows an assembly 1 of die blocks 2, 3 and 4 which are supported by a frame (not shown), die block 3 forming 2 tongue extending in the direction of the die mouth. Channels or distribution chambers 5 and 6 are filled with material through the inlet openings J, whereas channels or distribution chambers 7 and 8 are filled by other inlet openings, as can be seen from FIG. 1. The distribution chambers 7 and 8 are connected to respective outer channels in the form of longitudinal slits 9a and respective inner channels 9b whose cross-sections are regulated by lips 10a, 10b and 11a, and 11b capable of elastic deflection. The deflection of inner lips 10a and 10b is achieved by longitudinal incisions 14a and 14b. Depending on the cross-section of the channels, the longitudinal incisions are slit more or less deeply into the die blocks. The lips 10a and 10b, remote from a discharge slot 20, are adjusted by means of screws 12, whose heads are being held on the die blocks 2 and 4 by bars 15. Outer lips 11a and 11b, proximal to slot 20, are adjusted by screws 13 whose heads are held by blocks 16 which, in turn, rest upon blocks 17. For elastic deflection of the lips 11a and 11b, notches 18a and 18b are cut into the blocks 17. In the embodiment of the invention shown in FIG. 2, two additional distribution channels 19 are provided in block 3. By this means the deflection of the lips 10a and 10b acts only upon the layers issuing from channels 7 and 8, whereas the thickness of the layers issuing from channels 5 and 6 is controlled by lips 11a and 11b.

It will be obvious to those skilled in the art that many modifications may be made within the scope of the present invention without departing from the spirit thereof.

What is claimed is:

1. A band-producing nozzle comprising a nozzle body formed with an elongated discharge slot; a tongue fixed to said body and reaching toward said slot while having a stationary surface extending along the entire width of said slot; a resiliently displaceable inner lip anchored to said body at a location remote from said slot and deflectable toward and away from said surface while defining an inner channel therewith communicating with said slot; a resiliently displaceable outer lip anchored to said body at a location proximal to said slot and resiliently deflectable relatively to said tongue to define with said surface an outer channel communicating with said inner channel and leading to said slot; a first distribution chamber formed in said body and communicating with said inner channel for supplying synthetic-resin material thereto; a second distribution chamber formed in said body and communicating with said outer channel and independent from said first distribution chamber for supplying another synthetic-resin material to said outer channel for joint extrusion of said materials in respective layers from said slot; and respective adjusting means on said body for independent deflection of said lips to vary the widths of said channels.

2. The nozzle defined in claim 1 wherein at least one of said lips is formed unitarily on said body and is defined by an incision therein to render said one of said lips deflectable and said adjusting means includes at least one screw threaded into said body and bearing upon said one of said lips for bending same relative to the remainder of said body upon rotation of said screw.

3. The nozzle defined in claim 2 wherein the other of said lips has a stationary portion affixed to said body and is separated from said stationary portion by an incision, said adjusting means including a second screw threaded into said other of said lips and a nut bearing upon said stationary portion for deflection of said other of said lips upon rotation of said second screw.

4. The nozzle defined in claim 3 wherein said body extends on opposite sides of said tongue and is provided with pairs of inner and outer lips on opposite sides thereof defining respective sets of inner and outer channels on each side of said tongue with respective adjusting means therefor, said channels on both sides of said tongue merging together at said slot.

* * * * *